United States Patent [19]
Risse

[11] Patent Number: 5,806,386
[45] Date of Patent: Sep. 15, 1998

[54] PARTING-OFF A WORKPIECE IN A LATHE

[76] Inventor: John T. Risse, 28 Riverside Rd., Peralta, N. Mex. 87042

[21] Appl. No.: 303,065

[22] Filed: Sep. 8, 1994

[51] Int. Cl.$^6$ .............................. B23B 27/22; B23B 27/08
[52] U.S. Cl. ...................... 82/47; 82/52; 82/59; 407/117
[58] Field of Search .................................. 82/47, 49, 52, 82/53, 54, 59, 70.1; 407/103, 117, 120; 409/293; 83/72, 799, 857; 30/295

[56] References Cited

U.S. PATENT DOCUMENTS

| | | |
|---|---|---|
| 216,966 | 7/1879 | Miller . |
| 1,637,330 | 8/1927 | A'Hearn et al. . |
| 2,744,451 | 5/1956 | Lee ....................................... 407/117 X |
| 2,868,054 | 1/1959 | McQuillen . |
| 2,913,019 | 11/1959 | Sprague . |
| 3,172,191 | 3/1965 | Schoffel et al. ......................... 407/103 |

FOREIGN PATENT DOCUMENTS

| | | |
|---|---|---|
| 2300645 | 10/1976 | France . |
| 576163 | 10/1977 | U.S.S.R. . |
| 588052 | 5/1947 | United Kingdom . |
| 2139529 | 11/1984 | United Kingdom . |

OTHER PUBLICATIONS

*Machine–Tool Vibration:* "Machine–Tool Chatter"/Text unknown/pp. 40–12–40–15; pp. 40–32–40–51.

*Primary Examiner*—Andrea L. Pitts
*Assistant Examiner*—Henry W. H. Tsai
*Attorney, Agent, or Firm*—Rod D. Baker; Jeffrey D. Myers; Deborah A. Peacock

[57] ABSTRACT

A method and apparatus for cutting or parting-off the stock or workpiece in a lathe. The parting tool has a body, a cutting edge, and a rubbing pad permits substantially all the normal (radial) reaction forces to be reacted and neutralized within the body of the parting tool, substantially eliminating machine-tool chatter and vibration.

28 Claims, 6 Drawing Sheets

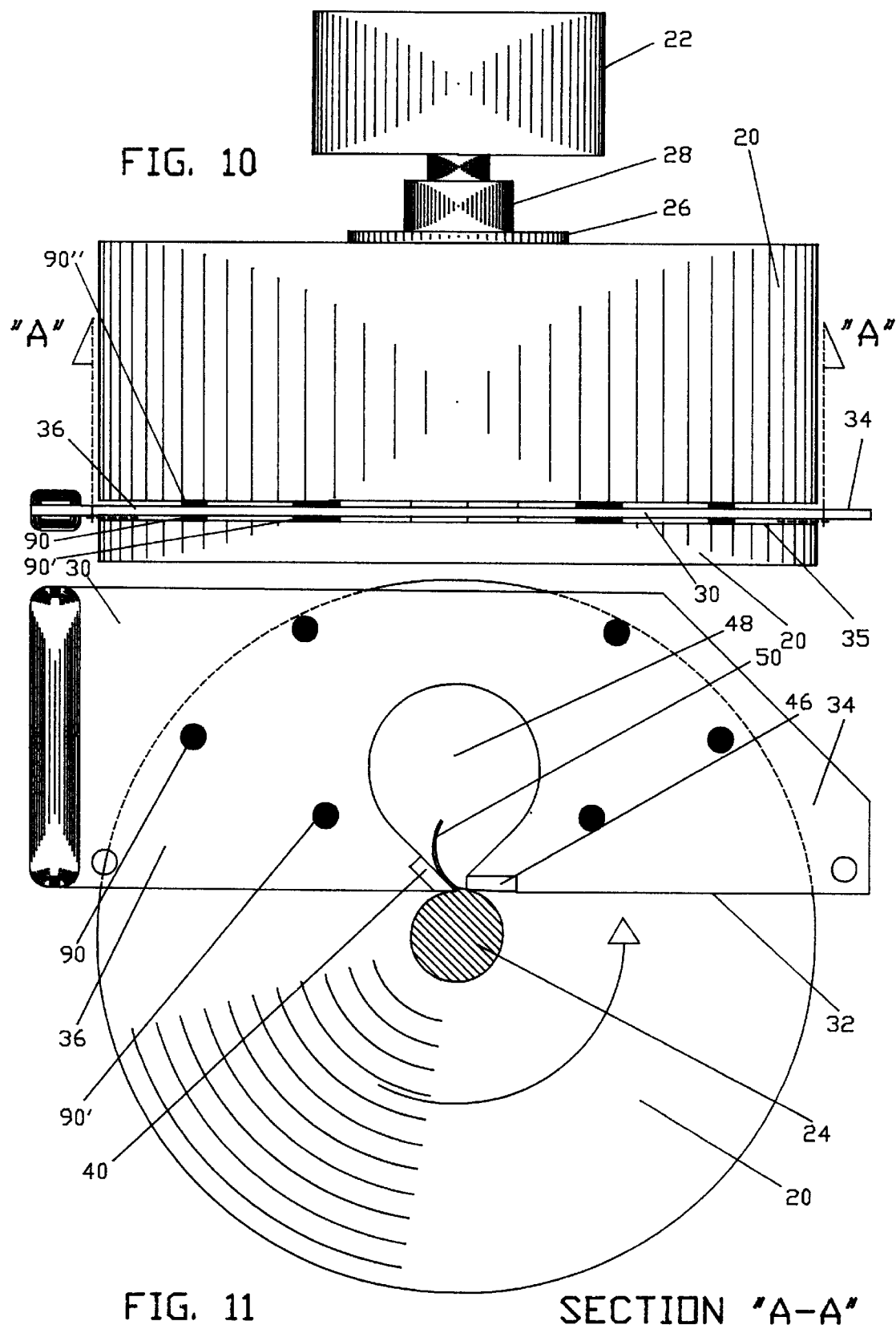

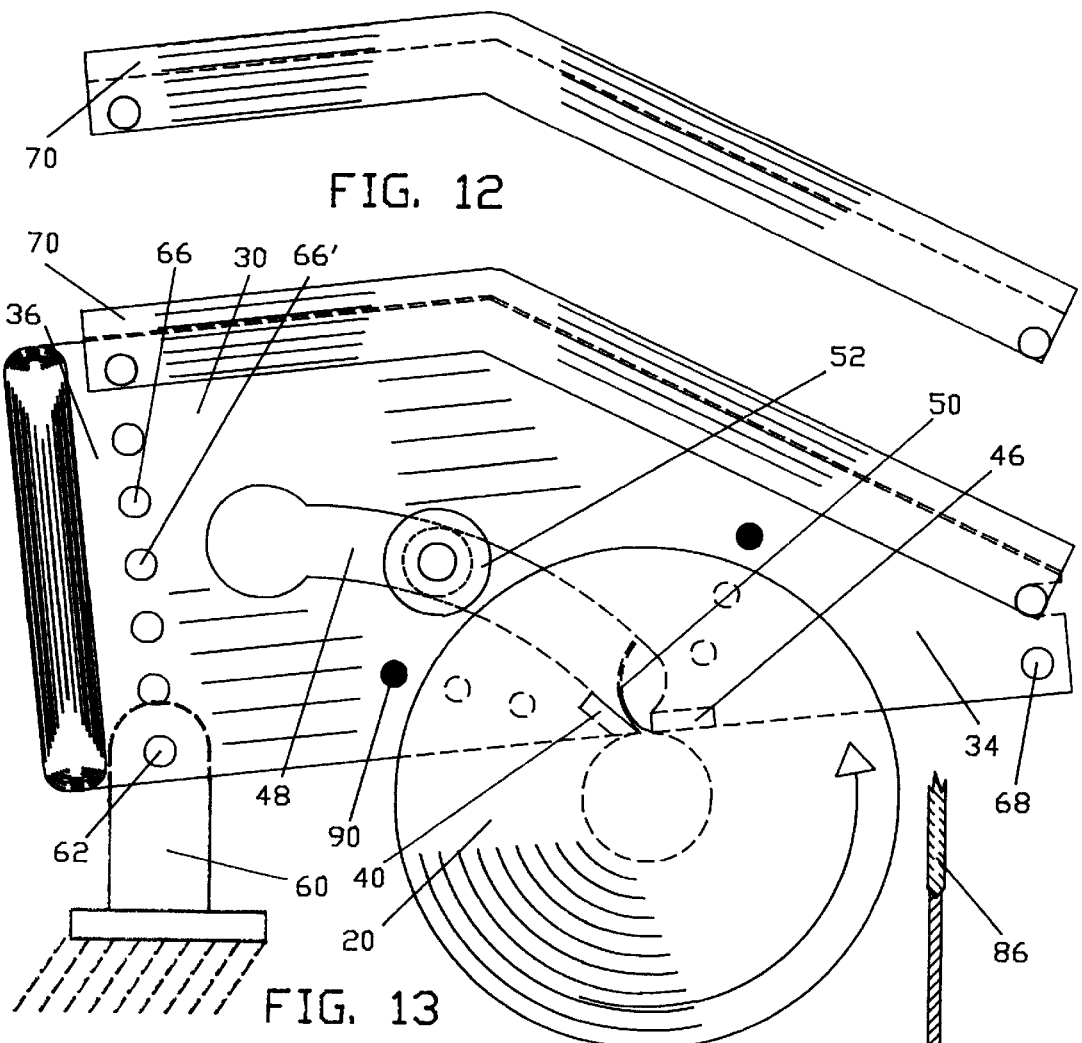
FIG. 12
FIG. 13
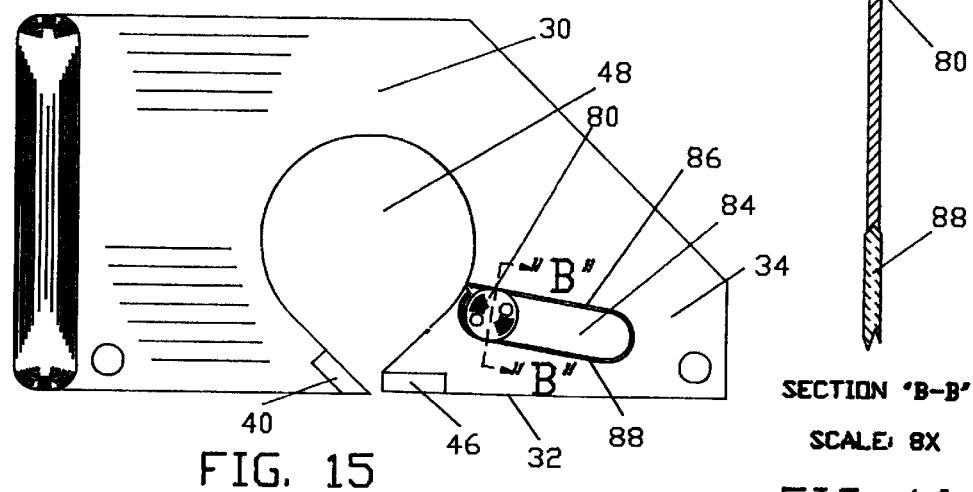
FIG. 15
SECTION "B-B"
SCALE: 8X
FIG. 16

PARTING-OFF A WORKPIECE IN A LATHE

BACKGROUND OF THE INVENTION

1. Field of the Invention (Technical Field)

The invention relates to a parting-off tool apparatus and method for its use, more particularly a parting-off tool for use with rotary lathes.

2. Background Art

It is known in the machining art that substantial skill and dexterity are required to use a lathe properly. A particularly demanding task when using a lathe, whether to turn metal, or wood, or some other material, is the parting off of a portion of the workpiece from the lathe. "Parting off" is the process of severing a section from the workpiece attached to the lathe's head-stock mechanism. Due to the depth of the cut and other considerations, the parting-off process can be fraught with difficulties such as workpiece vibration, "stutter" or "chatter," tool breakage, and the like.

Persons practicing in both the wood- and metal-working arts encounter substantial difficulty in making deep plunge cuts in rotating workpieces mounted in lathes. In the metalworking art, parting-off tools have dimensions typically ranging between 1/16"×1/2"×4 1/2" to 5/16"×1"×6 1/2". Thus presently in the art, the slenderness ratio of the typical tool bit, that is the ratio of the maximum length of the bit to its thickness, is commonly in the range of 72 to 20.8.

The parting tools known in the art are used in a fashion illustrated by the disclosures of United Kingdom Patent Specification No. 588,052, French Patent Publication No. 2,300,645, and Soviet Union Patent Publication 576,163, discussed below, which are fairly representative of past and present parting tool applications and general concepts. The parting-off tool normally is held within a tool holder device of some type. The tool holder is generally of a heavy-duty or massive construction. The tool holder is in turn securely disposed within a lathe cross-feed mechanism and is also held by the longitudinal feed slide. It is commonly the case in the present art that up to eighty or ninety percent of the length of the parting tool bit is supported and firmly gripped within the tool holder. If the slenderness ratio is calculated on the basis of the length of the tool bit that is unsupported by the tool holder, e.g., about twenty percent of the total length, the ratio is reduced substantially, commonly to between 14.4 to 4.2.

Difficulties arise when the machinist desires to make deep cuts to part off large workpieces. Presently in the art, deep cuts require that the slenderness ratio of the bit becomes excessive. When the parting-off tool is in use, the forces on the cutting edge of the bit may be resolved into vectors longitudinal to the bit (i.e. approximately collinear with the axis of the tool) and normal to the bit. The longitudinal force imposed by the workpiece on the bit is resisted comparatively well by the bit, as the bit functions structurally as a short column in compression. The perpendicular forces normal to the tip of the bit, however, load the bit as a cantilevered beam. Extending the bit in order to accomplish a deeper plunge cut demands an extension of the portion of the tool that is unsupported by the holder. The length of the tool that functions as a loaded cantilevered beam is thereby extended, and as it is lengthened the flexibility of the beam increases accordingly.

A fuller understanding of the state of the art and the improvements offered by the invention can be had by treating the parting-off tool as a cantilevered beam and by considering the formula for calculating the deflection at the end of a cantilevered beam with a concentrated end load. For purposes of parting-off functions, the longitudinal (axial) load on the tool can be disregarded, as it is compressive rather than deflective, and remains approximately constant as a plunge cut progresses. The maximum deflection of the cantilevered beam is described by $$D = \frac{PL^3}{3EI}$$

where D is the maximum deflection in units of length, P is the applied load in units of force, L is the cantilevered length, E is the modulus of elasticity of the beam material in compatible units, and I is the moment of inertia of the cross section of the portion of the beam that is cantilevered. Since the flexibility of the parting-off tool bit can be characterized as the amount of deflection per unit of normal loading, it is noted that $$\frac{D}{P} = \frac{L^3}{3EI}$$

Because the modulus of elasticity is an unchanging material property and the moment of inertia normally is constant throughout the length of the tool bit, the flexibility of the tool increases as the cube of the cantilevered length. Since the total deflection of the tool tip is what induces the tip to dig in and cause "chatter," "stutter," or vibration, these undesirable tip behaviors are aggravated as a function of the third power of the length of the cantilevered tool. A number of attempts have been made to overcome the difficulties associated with the parting-off and similar processes.

U.S. Pat. No. 216,966 to Miller, entitled *Machine for Trimming Circular-Valves*, discloses a rotary drum with accompanying fulcrum and lever for controlled cutting of materials of generally cylindrical shape.

U.S. Pat. No. 2,913,019 to Sprague, entitled *Tool Holder*, discloses a device for holding a cutting chisel against a rotating workpiece. No means or method is disclosed for overcoming the difficulties resulting from lengthy tool cantilevers required to accomplish deep plunge cuts.

United Kingdom Patent Specification (Provisional) No. 588,052 to Balmforth, entitled *Improvements in Tool Holders for Lathes or the Like Metal Cutting Machines*, discloses a device incorporating a stop bar which rides against the workpiece purportedly to prevent undue forward motion or jumping of the cutting tool.

United Kingdom Patent Application No. GB 2,139,529A to Armstrong, entitled *Parting-off Tool*, discloses a device incorporating a massive yoke member for holding a cutting blade, with the large mass of the yoke evidently serving to alleviate undue blade vibration.

French Patent Application Publication No. 2,300,645, entitled *Lathe Tool Holder for Parting-Off and Grooving Tools*, shows a device incorporating a projecting supporting member purporting to prevent vibration of the parting-off blade.

Soviet Union Patent Doc. No. SU-576-163 shows a parting-off cutting tool with a roller-assisted clamp purporting to prevent tool tip movement during tool withdrawal.

Despite the foregoing attempts, a need remains in the art for a parting-off tool and method which allows deep cuts during the parting-off process while avoiding deleterious forces against highly cantilevered tool blades and the consequential difficulties with vibration, stutter, and other undesirable tool behaviors.

SUMMARY OF THE INVENTION
(DISCLOSURE OF THE INVENTION)

The invention relates to a method and apparatus for parting-off or cutting a workpiece within a rotary lathe. The apparatus consists generally of a cutting means and a rubbing pad means, located proximately to one another upon a tool body. The cutting means and the rubbing pad contact the workpiece, with the cutting means performing the work of cutting while the rubbing pad rests or rides upon the surface of the workpiece to stabilize and properly position the tool. The tool body serves to resist, internally, the reaction forces resulting from the cutting process which act upon the cutting means and the rubbing pad, thereby completely or nearly completely neutralizing the reaction forces. The reaction forces are thus contained and reacted within the tool body itself, rather than being transmitted throughout the tool-lathe-workpiece system—which transmission promotes vibration and chatter.

A feature and advantage of the invention is the use of a cutting means that incises a kerf into the workpiece that is at least as thick as the tool body or the rubbing pad. Accordingly, the entire tool body, together with the cutting means, is progressively inserted into the kerf as the kerf deepens. Throughout the parting-off process, the rubbing pad is contactable with the uncut section of the workpiece at the bottom of the kerf, and thus continues to serve its purpose without regard for the progress or depth of the cut.

In the preferred embodiment of the invention, the cutting means and the rubbing pad are separated by a cutting gap within the tool body. The cutting gap leads into a chip clearance. The chip clearance allows material cut from the workpiece to move outward through the kerf to be expelled from the system.

The tool body may be spaced and positioned within the kerf through the use of spacing shims. The shims may be mounted on the sides of the tool body, where they may contact the rotating workpiece to align the tool within the kerf.

The invention optionally may include a slot-and-disk assembly or other elements permitting the adjustment of the relative positions of the rubbing pad and the cutting means, to control and improve cutting performance.

A primary object of the present invention is to provide a simple method and means for cutting a rotating workpiece within a lathe with a minimum of vibration, stutter, and chatter.

Another object of the present invention is to provide a method and means for localizing and resisting the reactive forces produced by the parting-off process to ameliorate undesirable vibrations in the cutting tool-lathe-user system.

A primary advantage of the present invention is that parting-off cuts can be performed quickly, smoothly and easily using the method and apparatus of the invention.

Another advantage of the present invention is that the apparatus of the invention is insertable into the cut produced by the apparatus, thereby permitting the apparatus to be stabilized and controlled throughout the parting-off process from the inception of the cut to final severing of the workpiece.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 10 is a top view of the lathe-workpiece assembly pertaining to the invention, depicting the cut in the workpiece and the apparatus of the invention disposed within the cut;

FIG. 11 is a side sectional view of the embodiment of FIG. 10, taken along section line A—A on FIG. 10;

FIG. 12 is a side view of a reinforcing rib element of the preferred embodiment of the invention;

FIG. 13 is a detailed side view of the preferred embodiment of the invention after a cut has progressed;

FIG. 15 is a side view of an alternative embodiment of the apparatus of the invention; and FIG. 16 is an enlarged sectional view of a portion of the FIG. 15 embodiment, taken along sectional line B—B of FIG. 15.

Figure 1:
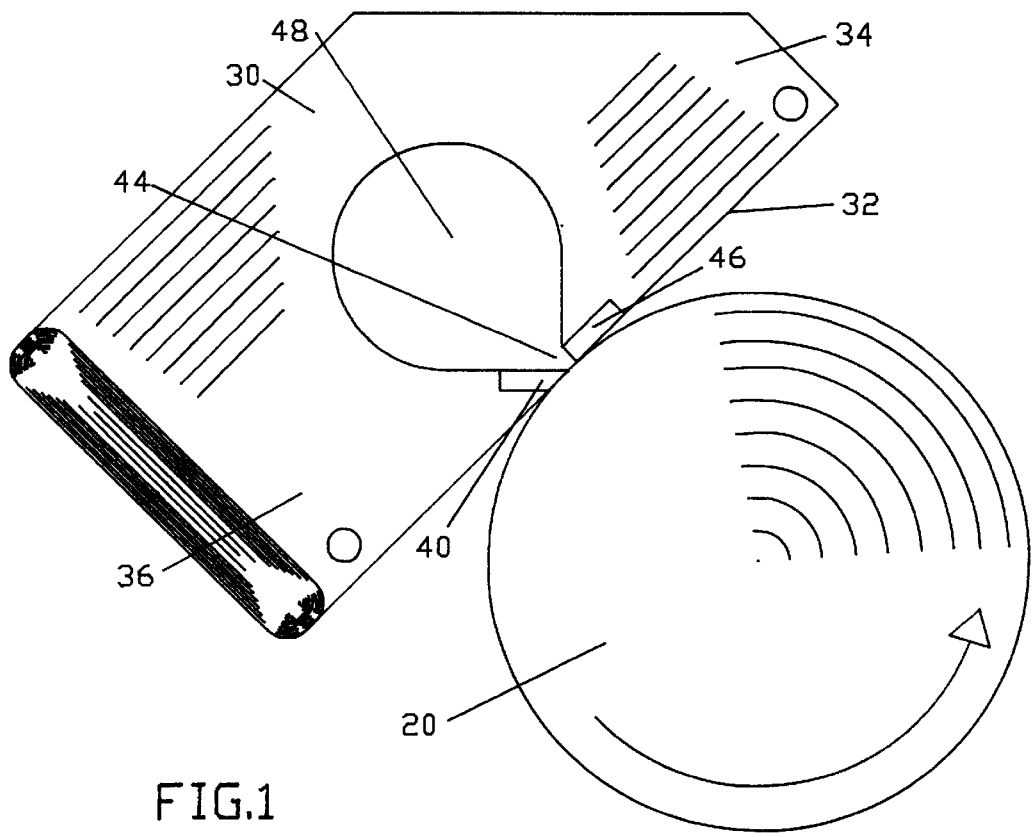
FIG. 1 is a side view of an embodiment of the apparatus of the invention, at the inception of a cut into a workpiece.

DESCRIPTION OF THE PREFERRED EMBODIMENT (BEST MODE FOR CARRYING OUT THE INVENTION)

The invention relates to an apparatus and method for accomplishing parting-off and similar processes in the operation of rotary lathes. More particularly, the invention enables the user to accomplish deep plunge cut and parting-off processes at ratios of kerf depth to tool blade thickness of up to 500 and more. The "kerf" is the narrow cut made into a workpiece by the action of pushing a cutting tool against a rotating workpiece. The kerf begins as a shallow crease about the circumference of the workpiece; as the cutting or parting-off tool is pushed into the rotating workpiece, the cutting tip or bit scores, and then incises, the workpiece. With continued applied force to the tool, the kerf progressively deepens (but maintains a nearly uniform thickness, which is slightly greater than the thickness of the cutting tool).

In this disclosure and in the claims, unless otherwise indicated, "thickness" refers to a measurement along, or parallel to, the rotational axis of the workpiece. The "kerf depth" is the necessary exposure of a length of tool required to reach the maximum depth of the desired cut. In this disclosure and in the claims, unless otherwise indicated, "depth" refers to a measurement perpendicular and radially to the rotational axis of the workpiece. The maximum kerf depth is the radius of the workpiece; when kerf depth equals the radius, the workpiece has been severed or "parted off." The maximum slenderness ratios for the apparatus of the invention are variable, depending upon the material being machined and the user's particular skill and technique. Materials and techniques are parameters that may be varied over wide limits in order to adapt the invention design to particular applications.

The principal concepts and advantages underlying the invention are related to structural dynamics, since the present state of the art is concerned with "stutter, "chatter," or vibration during cutting. The devices of the prior art address vibration problems primarily by maintaining high rigidity in the parting-off tool mechanical system.

Tool-and-lathe system rigidity is analogous to the "stiffness" of a typical spring. The entire system may be analogized to a spring-mass loop—from the tool tip back through the tool, tool holder, tool post, cross-feed mechanism, longitudinal feed slide mechanism, lathe bed ways or frame, headstock, chuck or other workpiece-holding and driving features, and through the workpiece itself. This loop description refers primarily to a metal-cutting lathe, but is also relevant in the case of a wood-turning lathe. Since the natural frequency of a simple spring-mass system is directly proportional to the square root of spring stiffness, and inversely proportional to the square root of mass, it is readily observed that high "rigidity" refers to high system natural frequencies, and that high "stiffness" assists in accomplishing high frequencies and, thus, system stability.

Some prior art attempts to address the flexibility and chatter problems have involved placing the cutting tool blade in a vertical orientation so that the major cutting force, which is perpendicular to the usual tool bit, is directed along the axis of the tool bit. But such prior art also acknowledges the necessity for stiffness in the entire lathe-workpiece-tool-operator system by providing massive cutting tools cantilevered from, and supported as closely as possible in, the tool holder. (An example of such an effort is shown in United Kingdom Patent Application No. GB 2,139,529A.) But flexibility—and the resulting chatter—problems resulting from long cantilevered tool bits are addressed at the expense of adding a large mass suspended from the tool holder. Such an approach leaves the fundamental problem unanswered, because as the depth of the cut becomes greater and the workpiece becomes larger, the tool and its yoke or shank, must become of truly massive proportions. Because the chatter or vibrations sought to be avoided are as much a function of the sprung mass as they are of the spring that supports it, massive blade yokes suspended from the tool holder do not solve, but rather aggravate, the overall vibration/chatter problem; the mass has been increased without a concomitant increase in the machine stiffness. The remaining flexibility in the mechanism of the entire lathe system, from the tool holder back through the lathe to the headstock, chuck, and workpiece, remains unaddressed.

Accordingly, the flexibility of the tool tip with respect to the workpiece is a function not only of the stiffness of the tool bit itself, but also the flexibility of the entire lathe. Since the reaction between the tool bit and the workpiece includes the flexibility of the tool holder, cross-feed, longitudinal feed slide, head-stock mechanism and chuck, there is little the average operator can do with a particular machine to control the flexibility, and therefore, the tendency for the system to chatter. (Consideration of deflections of the actual workpiece is omitted, since that variable is not intrinsically within the control of either the machine, the tool, or the operator.)

The forces exerted on the workpiece are reacted by the equal and opposite forces on the tool. Therefore, the total stiffness of the lathe machine, tool and workpiece, come into play in determining whether or not chatter will occur. This is true for either metal- or wood-turning lathes, and whether the turning axis is horizontal, vertical, or inclined. Cutting tools in the wood-turning art are commonly held or grasped in the user's hand. The wood-turner, who, by using a hand-held tool, is reacting some of the cutting-tool forces within himself, is at an even greater disadvantage than the operator turning metal, because his body is generally more compliant than either the machine or the tool.

Figure 2:
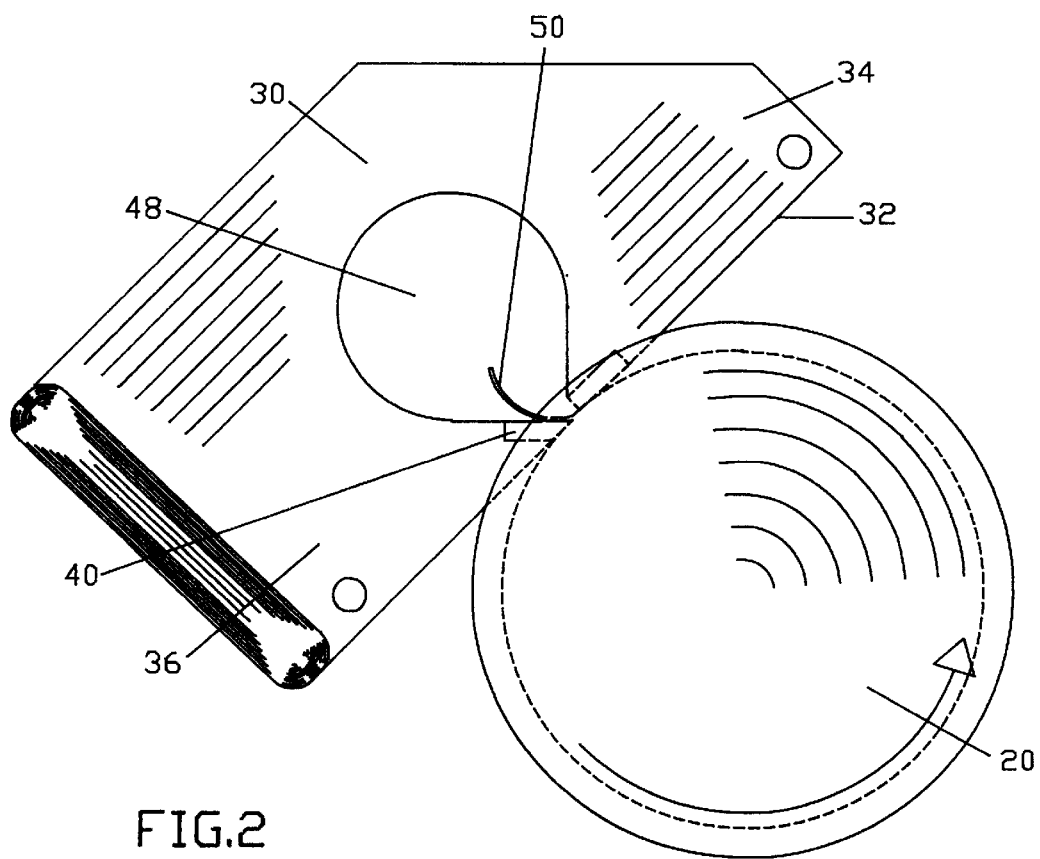
FIG. 2 is a side view of the FIG. 1 embodiment after the cut has progressed.
Figure 3:
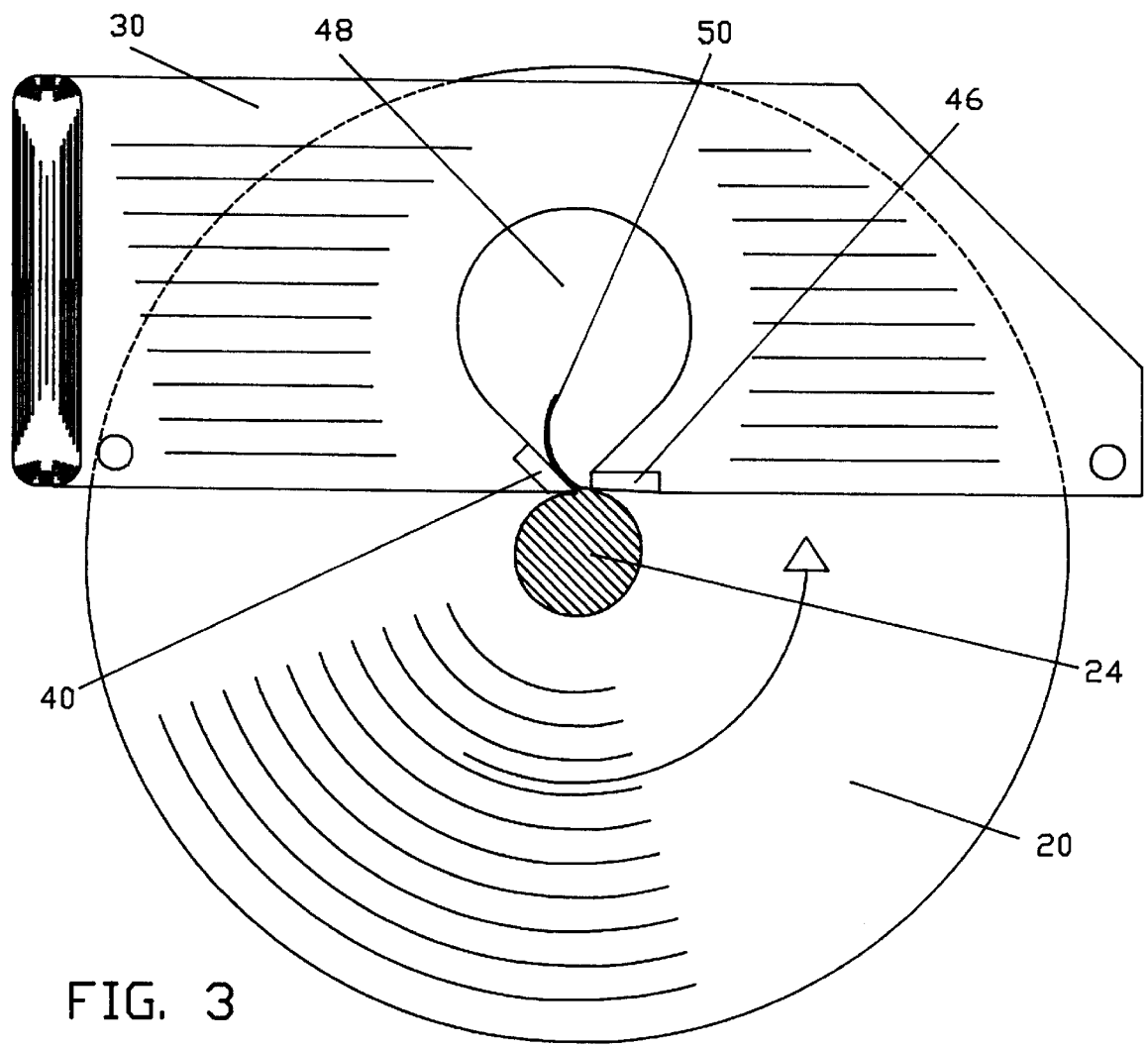
FIG. 3 is an enlarged sectional side view of the FIG. 1 embodiment with the cut nearly completed.

Reference now is made to FIGS. 1–3, which illustrate a simple embodiment of the apparatus of the invention. In all the Figures, workpiece 20 is disposed within a lathe according to methods known in the art. In FIGS. 1–3, workpiece 20 is shown to be rotating about its own axis in a counter-clockwise direction, as indicated by the motion arrows in those Figures. Thus, the top of workpiece 20 rotates toward the operator; for the sake of clarity, neither the operator nor the lathe are shown in FIGS. 1–3, but the operator is deemed to be located to the left of each of FIGS. 1–3. The relative positioning of the user and the lathe are according to convention in the art. Workpiece 20 is shown to have a circular cross section, but it will be understood that non-cylindrical workpieces may be parted off by the invention.

The invention includes a tool body 30, which is preferably generally planar and specially configured to accomplish the advantages of the invention. In FIG. 1, tool body 30 is shown in its position at the very inception of the cutting or parting-off process, with tool body 30 in slight contact with the rotating workpiece 20. FIG. 2 depicts the position of tool body 30 after parting-off has been commenced and the cut has progressed to the point that the kerf depth is 10% of the radius of the workpiece. FIG. 3 shows the relative positions of workpiece 20 and tool body 30 after the cut has progressed nearly to the axis of workpiece 20, i.e., the kerf depth is 90% of the radius of the workpiece, and the parting-off is nearly complete except for uncut section 24 of workpiece 20. The cutting into workpiece 20 is accomplished through the application of suitable force—typically consisting of a controlled pushing or pressing by the user—upon the tool body 30 directed very generally along a vector perpendicular to the rotational axis of workpiece 20. During the progress of the cut, tool body 30 will undergo rotational movement, as is apparent from FIGS. 1–3, but may also undergo rectilinear movement relative to, and toward, the rotational axis of workpiece 20.

Reference is made to FIGS. 10 and 11, which further illustrate the general practice of the invention. Like FIG. 3, FIGS. 10 and 11 show tool body 30 in a position after the cut has progressed nearly to the axis of workpiece 20. FIG. 10 depicts a top view of the lathe headstock 22, faceplate 26, chuck 28 (or other attachment mechanism known in the art) and tool body 30. The faceplate 26 is fixed to and secures workpiece 20. Tool body 30 is within the narrow cut or kerf 35, that has been made circumferentially about and into workpiece 20 by the action of tool 30. As shown in FIG. 10, the kerf 35 is slightly thicker than the thickness of tool body 30.

FIG. 13 illustrates an embodiment of the apparatus of the invention in a suitable operating context. Tool body 30 may be pivotably disposed upon tool post 60. Tool post 60 is secured to a work bench, sturdy tool stand, or other firm base, and functions to resist, without significant displacement, external forces against it. Tool 30 is connected to post 60 by a pin or axle 62 inserted through an opening in post 60 and through any aligned one of a plurality of mounting holes 66,66' piercing base 36 of tool 30. So connected, the tool 30 may be rotated about pin 62 and thus pivot with respect to workpiece 20. Thus, the user may adjust the position of tool 30 not only by pivoting, but also by selecting which of the plurality of mounting holes 66,66' to use. FIG. 13 also illustrates that tool 30 optionally may have one or more outboard mounting holes 68 at head 34 of tool 30. Outboard mounting holes 68 may be used to attach an external support, pivot post, or control device at the head 34 of tool 30; e.g., when workpiece alternatively is rotating in an opposite (clockwise) direction, the tool 30 is used with its outboard end or head 34 restrained by a post or the like.

FIGS. 12 and 13 illustrate that tool 30, if unusually thin, optionally may be stiffened or reinforced by reinforcing member 70, shown isolated in FIG. 12, which may be permanently or temporarily secured to the spine of tool body 30. It will be apparent that in certain applications, a similar reinforcing member could be crafted and attached to a portion or portions of working edge 32 of tool body 30 as well.

FIGS. 10, 11, and 13 also illustrate the placement of two or more optional spacer shims 90,90',90" on the sides of tool body 30. When employed, spacer shims 90,90',90" number at least one on each side of tool body 30. Shims 90,90',90" are small metal or plastic discs, weld puddles, or the like, preferably temporarily attached, or alternatively permanently affixed, to tool body 30, and serve to position tool body 30 symmetrically within kerf 35. Spacer shims 90,90', 90" rub against the workpiece 20 defining the sides of the kerf 35, thereby spacing the tool body 30 within kerf 35. Thus spaced and positioned, the tool body 30 remains properly aligned to produce a straight cut. It is noted that the thickness of the spacing shims 90,90' is a function mainly of the thickness of cutting tip 40. Since the thickness of kerf 35 is very nearly identical with the thickness of cutting tip 40, the thickness of a pair of spacing shims 90,90',90" plus the thickness of tool body 30, preferably approximately equals the thickness of cutting tip 40.

Attention is again returned to FIGS. 1–3. Tool body 30 is generally described as a planar plate of stainless steel or the like. When tool body 30 is in use, base 36 of tool body 30 is disposed within the tool holder or post (not shown in FIGS. 1–3) or is manually supported. Distally located from base 32 is head 34. Extending from base 32 to head 34, except for an interruption at cutting gap 44, is rectilinear working edge 32, which faces workpiece 20. Disposed upon working edge 32 is cutting tip 40, composed of tungsten carbide or other material known in the art for durability and ability to hold a sharpened edge. Cutting tip 40, which has a short sharp edge that is generally parallel to the axis of the workpiece 20, is the component of the invention that performs the physical cutting of workpiece 20.

Also disposed upon, or alternatively forming an integral portion of, working edge 32 of tool body 30 is rubbing pad 46. Rubbing pad 46 is proximate to cutting tip 40, between cutting tip 40 and head 34 of tool body 30. When the invention is properly practiced, rubbing pad 46 rests gently against the rotating workpiece 20 to control the operation of cutting tip 40, in a manner that will be further explained. Rubbing pad 46 may be a polished, hardened, removable attachment or may simply be a length of working edge 32.

Separating rubbing pad 46 from cutting tip 40 is cutting gap 44. Cutting gap 44 is an interruption in the continuity of working edge 32. Cutting gap 32 leads into chip clearance 48.

Chip clearance 48 is a fissure or aperture completely through the thickness of tool body 30. As shown in FIGS. 2 and 3, as workpiece 20 rotates into cutting tip 40, cutting tip 40 cuts into workpiece 20 and shaves away from workpiece 20 a sliver or chip 50 of workpiece material. Chip 50 forms in the familiar manner, by continuously curling away from workpiece 20 until it is severed entirely away from workpiece 20. Chip clearance 48 serves as a passage for the collection and ejection of accumulating chips 50.

As chip 50 grows, or as a collection of severed chips accumulate, the spiraling growth or accumulation occurs mostly or partially within chip clearance 48, and within the kerf 35. The chip clearance 48 of the invention offers the advantage that accumulating chips, slivers and particles severed from workpiece 20 by the action of cutting tip 40 do not accumulate in the kerf 35 between tool 30 and workpiece 20, which accumulation can lead to binding, dragging, burning, and vibration. Chips 50 that collect within chip clearance 48 eventually are reduced to small particle size by the rotating action of the adjacent workpiece 20, and then work their way up and out of kerf 35. Also, tool body 30 typically is periodically pulled out of the kerf 35 to clear accumulated particles from within chip clearance 48.

FIG. 13 shows that in one embodiment of the invention, chip clearance 48 within tool body 30 is so configured as to have a length at least as long as the kerf depth. A long, preferably curved, chip clearance 48 as that depicted in FIG. 13 allows for chip clearance 48 to extend to beyond the maximum kerf depth, even at an advanced stage of the parting-off process, when cutting tip 40 approaches the rotational axis of workpiece 20. With chip clearance 48 so configured, it will emerge from the kerf 35 and extend beyond the maximum (i.e. original) radius of workpiece 20. Accordingly, in the embodiment of FIG. 13, accumulating chips, sawdust, particles, and the like, migrate up the chip clearance 48, within kerf 35, and then are ejected from within tool body 30 at the surface of workpiece 20. Since in this embodiment chip clearance 48 extends the full radius of the workpiece 20 and beyond, accumulating chips and shavings pass therethrough, rather than necessitating the occasional momentary retraction of the tool body 30 from the kerf 35 to permit the clearing of chips from the chip clearance area 48.

Figure 14:
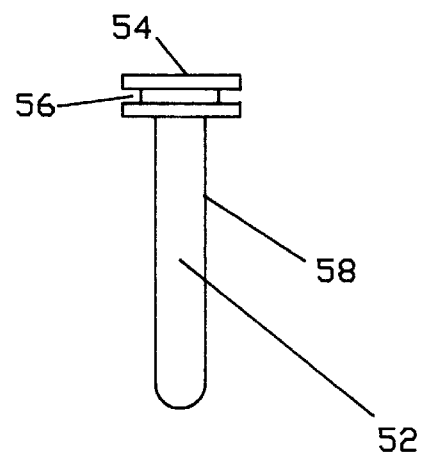
FIG. 14 is an enlarged top view of the ancillary alignment tool shown in the embodiment of FIG. 13.

In those embodiments of tool body 30 incorporating a lengthy chip clearance 48, it is advantageous to use an ancillary alignment tool 52, as shown in FIGS. 13 and 14. A shown in FIG. 14, alignment tool 52 consists of a disk 54 with notch 56 around its circumferential edge. Starting handle 58 is perpendicularly attached to disk 54 to foster manual manipulation of the alignment tool 52.

As depicted in FIGS. 13 and 14, alignment tool is inserted into chip clearance 48. The sides of the chip clearance 48 are parallel, and fit into notch 56 of alignment tool 52. By grasping handle 58, the user of the invention can slide or roll the alignment tool 52 within chip clearance 48.

Installed within chip clearance 48, the alignment tool 52 serves to prevent the tool body 30 from flexing in such a manner as to laterally deflect the relative positions of the cutting tip 40 and the rubbing pad 46. Such undesirable movements may make it difficult to initiate the kerf 35 in a perfect plane perpendicular to the axis of the workpiece 20. After the initiation of a cleanly incised kerf, the cutting tip 40 and rubbing tip 46 will track naturally therein, and the alignment tool 52 may be altogether removed, if desired.

In use at the beginning of the cutting process, the alignment tool 52 is placed in the chip clearance 48 near cutting tip 40. As the cut progresses and the kerf 35 deepens, the alignment tool 52 is moved (using handle 58) along the chip clearance 48 away from cutting tip 40, such that the alignment tool 52 is never within the kerf 35 but rather remains accessible beyond the original radius of the workpiece 20, as shown in FIG. 13, or may be removed entirely.

FIGS. 2, 3, 10, and 11 illustrate that rubbing pad 46, however, does not remain in contact with the uncut original surface of workpiece 20. On the contrary, as the cutting proceeds, the entire working edge 32 of the tool 30 progresses into the deepening kerf 35. As the cutting tip 40 incises a progressively deeper kerf 35, the entire tool body 30, together with the rubbing pad 46 simultaneously is inserted into the kerf 35. Rubbing pad 46 preferably is nearly the same thickness as cutting tip 40; in any event, it is no thicker than cutting tip 40, and hence is narrower than the thickness of the kerf 35 cut. Therefore, as the kerf 35 deepens, rubbing pad 46 moves into the kerf 35.

As best depicted in FIGS. 3 and 11, as the kerf 35 deepens rubbing pad 46 remains generally at the bottom thereof, against the uncut section of the workpiece 24. The pad 46 is permitted to rub against workpiece 20, preferably maintained in substantially constant contact with the unsevered section of workpiece 24, except for occasional momentary withdrawal of tool body 30 to clear out the chip clearance area 48. Unsevered section 24 of workpiece 20 (which connects the parted off section of workpiece 20 with the residual portion of workpiece 20 connected to faceplate 26) of course ceases to exist when parting-off is complete. Rubbing pad 46, by resting against the rotating section of unsevered section 24, substantially aids the user of the invention in controlling and manipulating the tool body 30 and cutting tip 40. Pad 46 and cutting tip 40, being in close physical proximity and direct connection with the tool body 30, act in concert to counteract and contain the forces that lead to undesirable vibration and chatter.

Figure 4:
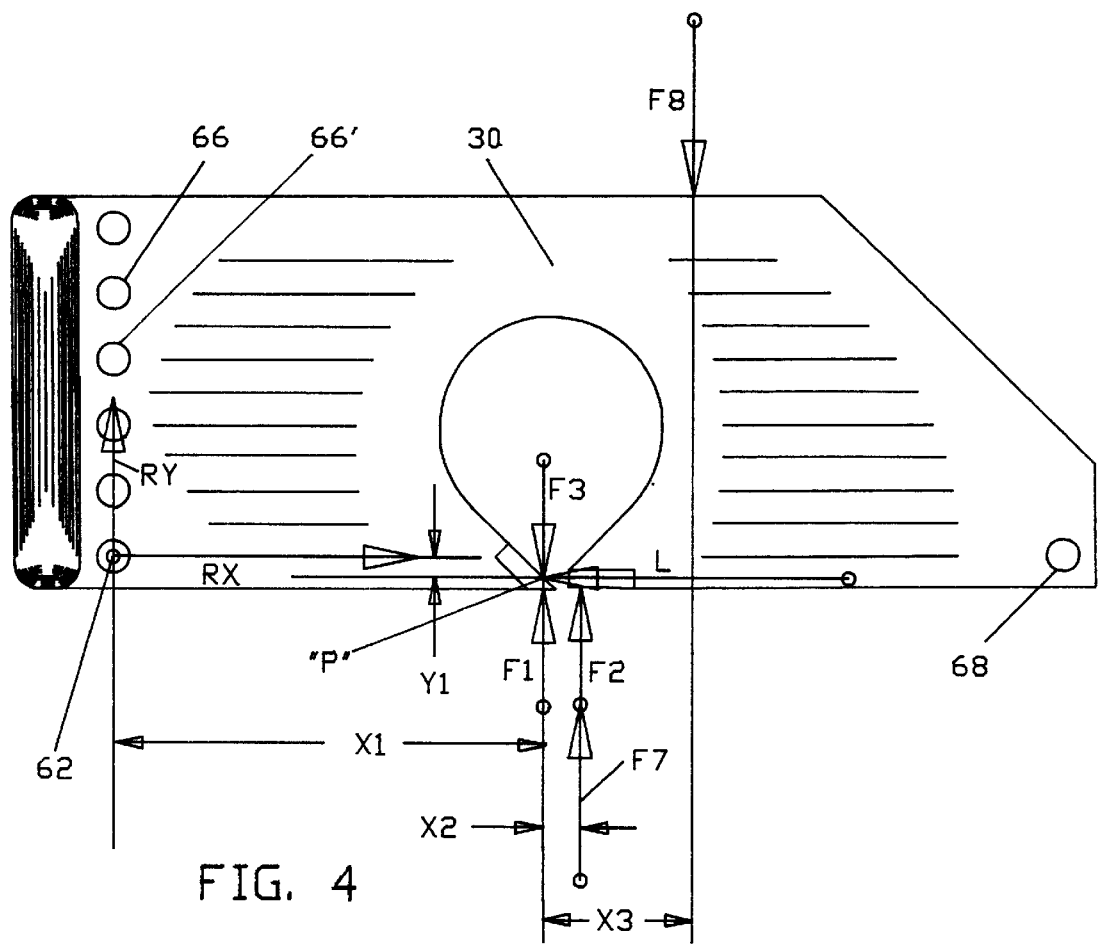
FIG. 4 is a side view of the FIG. 1 embodiment, and is a free-body diagram of various of forces acting on the apparatus of the FIG. 3 embodiment.
Figure 5:
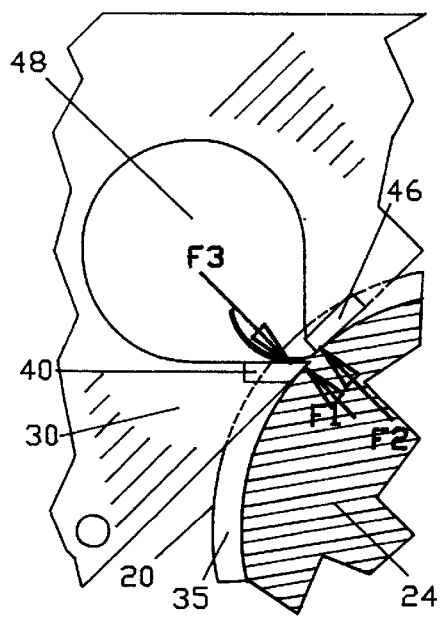
FIG. 5 is an enlarged partial sectional side view of the FIG. 2 embodiment, depicting reactive normal forces on the apparatus of the invention.
Figure 6:
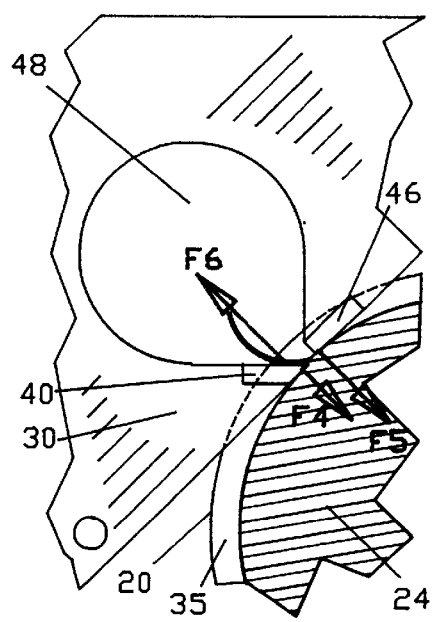
FIG. 6 is an enlarged partial sectional side view of the FIG. 2 embodiment, depicting normal forces on the workpiece in the vicinity of the apparatus of the invention.
Figure 7:
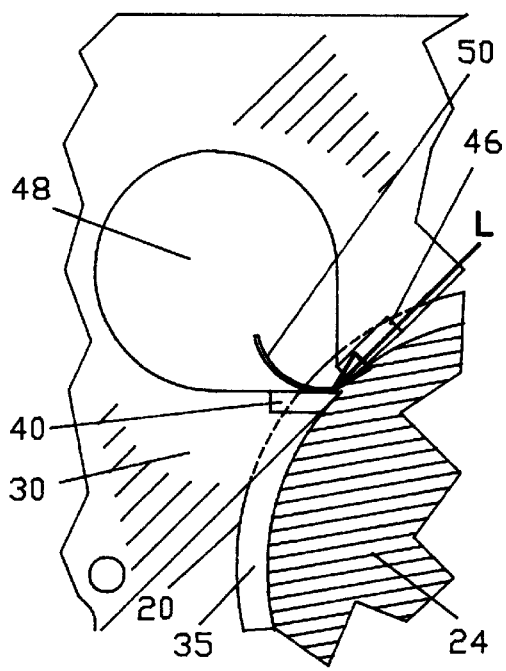
FIG. 7 is an enlarged partial sectional side view of the FIG. 2 embodiment, depicting a reactive longitudinal force on the apparatus of the invention.

Reference is made to FIGS. 5, 6, and 7, depicting the equilibrium forces during the cutting process. FIG. 5 illustrates the forces, denoted by vector arrows F1, F2 and F3, acting on tool body 30 in the vicinity of the cutting tip 40 and rubbing pad 46. Forces F1, F2 and F3 result from externally applied force (denoted as F8 in FIG. 4), which may be applied by the operator (and may, at times, actually be a zero force) and has a vector component directed generally toward the axis of workpiece 20. FIG. 6 illustrates the equilibrium forces, denoted by vector arrows F4, F5 and F6, acting on workpiece 20 and that are equal in magnitude and opposite in direction to forces F1, F2 and F3, respectively. Forces F1, F2, F3, F4, F5 and F6 act generally directed radially through the axis of workpiece 20, but for the sake of ease of explanation, may be considered as acting perpendicularly to the tangent to the circumference of workpiece 20 at the location where cutting tip 40 contacts the surface of workpiece 20.

FIG. 7 shows that the cutting action of tip 40 into workpiece 20 involves a longitudinal force L acting on cutting tip 40, acting parallel or collinearly with the tangent to the surface of workpiece 20.

Assuming workpiece 20 is composed of a generally homogenous material, the chip depth will be nearly constant, or is at least the maximum allowed by the cutting-tip-to-rubbing pad geometry (a function primarily of the degree of relative offset between tip 40 and rubbing pad 46 (with respect to the surface of unsevered section of workpiece 24)). With this assumption, it is also clear that the longitudinal force L and normal forces F1, F2, F3, F4, F5 and F6 remain the same for the duration of the cut from start to finish. An equilibrium analysis of all the forces makes it plain that the longitudinal force L on the tip 40 is reacted either by some sort of mechanical reaction device, such as a tool post or tool rest, or by the operator.

Figure 8:
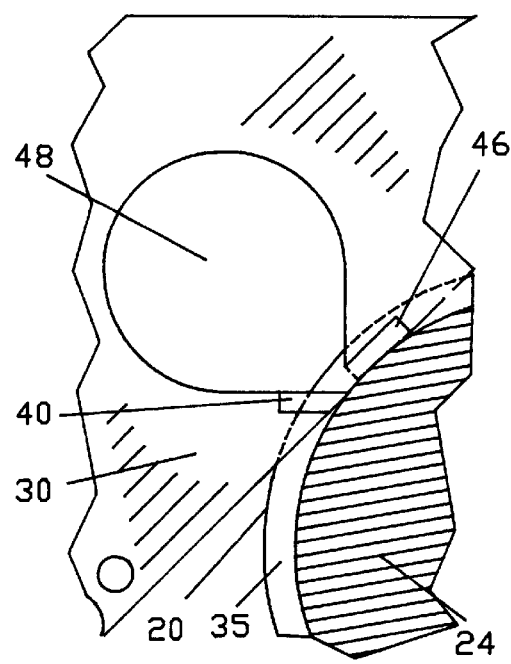
FIG. 8 is an enlarged partial sectional side view of the embodiment of FIG. 2, depicting the apparatus of the invention in a backed-down, non-cutting position.
Figure 9:
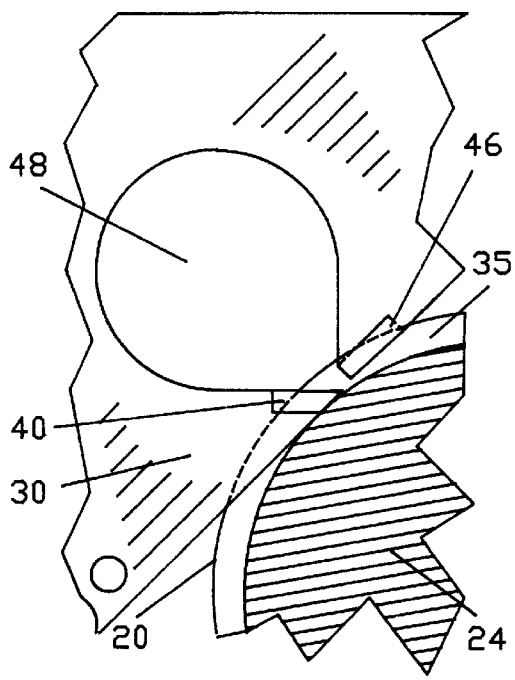
FIG. 9 is an enlarged partial sectional side view of the embodiment of FIG. 2, depicting the apparatus of the invention in a pushed-up, non-cutting position.

In any case, no harm will come to the user of the invention or the workpiece 20, because if too little external force is applied in reaction to longitudinal force L, tool body 30 and cutting tip 40 will move slightly backward, toward the user, and the tip 40 will disengage from the uncut section of workpiece 24 and quickly cease cutting a chip (although pad 46 may remain in contact with the workpiece) as shown in FIG. 8. Similarly, if the user pushes too hard, the cutting tip 40 of the invention begins to ride up on the uncut workpiece 24 and, again, the tip 40 stops cutting, as shown in FIG. 9.

The invention allows the user to perform deep plunge cuts by, among other things, eliminating the problem of long cantilevered cutting-tool arms. As mentioned, the formula for a beam's relative flexibility is $$\frac{D}{P} = \frac{L^3}{3EI}$$

L, the length of the cantilever, when extended results in great system flexibility. Other variables that may be manipulated to increase rigidity are E and I. Increasing the modulus E requires an alteration of beam composition to a material of greater modulus; due to materials properties constraints, however, gains of a factor of greater than two would be very difficult. The cross-section moment of inertia I is defined (for a rectangular cross section) as $$I = \frac{bd^3}{12}$$

where b is the tool thickness, and d is the section depth. In the present context, increasing b offers no improvement, since making the blade thicker simply increases cutting forces in direct proportion. Increasing d increases I, and thus reduces flexibility, as a cubic function.

It is thus apparent that great gains in the stiffness of the tool bit cantilevered beam can be made by increasing the tool depth, d. However, increasing tool depth still does not address the profound impact of lengthy cantilevered tools, which all suffer from the flexibility remaining in the machine and/or operator.

The present invention solves the problems in the art by closing the spring-mass loop within the tool body 30 itself (with the exception of the flexibility of the workpiece 20 which can be accommodated using known methods). When a particular tool 30 is proportioned to cut a shallow groove, it is also properly proportioned for very deep cuts.

With continued reference to FIGS. 5 and 6, it is noted that the normal forces produced by the cutting action are completely reacted within and resisted by tool body 30 in the immediate vicinity of the cutting tip 40 and rubbing pad 46. Due to this extremely localized reaction, forces F1, F2 and F3 are effectively neutralized in the immediate vicinity of cutting tip 40 and rubbing pad 46, rather than acting through the tool body 30 to be resisted by the user's hands and/or a tool rest or post 60 (FIG. 13). Reactive forces acting through the tool body 30 and upon the means of tool body support, and attributable to the cutting action, whether the support be the user himself or a tool post 60, are minimized. Consequently, the characteristics of the lathe machine and operator do not enter into the spring-mass system. Thus, tool body 30 is configured to react completely within itself the forces F1, F2 and F3, eliminating the need to react these forces through a tool holder or through the user. Tool body 30 may be designed and manufactured for use in cutting a reasonable range of materials (e.g., built primarily for wood), and can be expected to be suitable for a wide range of material properties, diameters, or cutting speeds. A tool 30 properly proportioned to cut well in a shallow kerf can be depended upon to cut properly for even very deep, narrow kerfs. Further, it may be depended upon to perform similarly on any machine, with any operator of ordinary skill.

The flexibility of workpiece 20 as a source of chatter is ameliorated by the responsive operation of the invention. As shown in FIG. 7, workpiece 20 has tangential force L acting upon it. Force L can cause deflection of workpiece 20 in a tangential direction and begin to set up the conditions for vibrations to occur. However, as depicted in FIGS. 8 and 9, the geometry of tool 30 dictates that a movement of workpiece 20 in either tangential direction will decrease the depth of cut, and thereby reduce the magnitude of the tangential force L. This effect and advantage is especially noticeable in wood turning, where workpiece 20 may be highly non-homogeneous and the cutting forces vary widely.

The foregoing is further understood within the comprehensive context of FIG. 4. FIG. 4 shows a free-body diagram of the parting tool body 30 with all the usual operating forces indicated. The weight of the tool body, acting at the center of gravity, is not shown because it is generally a small constant force, easily measured, and can be make to act coincidentally with the other major forces. Also, the possible friction forces acting tangential to the workpiece 20 at the cutting tip 40 or rubbing tip 46, are omitted. They are small for the very hard materials in the rubbing tip 46 and cutting tip 40 acting against the workpiece 20 and, in any case, are very nearly collinear with the longitudinal force L, such that they would be indistinguishable from force L. Further, in the case of metal turning, such small forces are amenable to reduction through the use of lubricating cutting fluids, as is commonly practiced.

During operation, the parting tool body 30 is in a state of essentially static equilibrium, a condition easily described using statics equations. The rules for positive and negative directions may be as normally assumed: positive is to the right, upward, and clockwise; negative is to the left, downward, and counterclockwise. The edge of the base 36 of the tool body 30 may be taken as defining the positive "y" axis, while the working edge 32 defines the positive "x" axis, as commonly understood in Cartesian coordinate math.

Referring to FIG. 4, and FIG. 13, and elementary principals of statics, the sum of the x-direction forces is zero. Therefore, the reaction force shown by vector arrow RX in FIG. 4 is equal and opposite to longitudinal cutting force L, thus $$RX - L = 0 \text{ or, } RX = L$$

The sum of the y-direction forces (including reaction force RY) also is zero; thus, in FIG. 4, $$RY + F1 + F2 + F7 - F3 - F8 = 0 \text{ or,}$$

$$RY + F1 + F2 + F7 = F3 + F8$$

The sum of the moments about any point is zero. Therefore, summing moments about point "P," with respective moment arms X1, X2, X3, and Y1, on FIG. 4:

$$RYX1 + RXY1 - F2X2 - F7X2 + F8X3 = 0 \text{ or,}$$

$$RYX1 + RXY1 + F8X3 = F2X2 + F7X2$$

Simplifying assumptions may be made by noting the following: The reaction force F2 on the rubbing tip 46 (see FIG. 5), may be considered to be composed of two parts, namely forces F2 and F7 in FIG. 4. This allows force F2 to be defined as equal in magnitude to force F3 (see also FIG. 5) under all conditions.

Force F7, then, simply makes up any difference in magnitude between force F3 and the total reaction of the rubbing tip 46 in the Y direction. Simplification yields $RY + F1 + F7 = F8$, and, noting that F8 is an externally applied force whose magnitude and moment arm X3 are at the discretion of the operator, the situation where F8=0 may be examined; it is determined that $$RYX1 + RXY1 = F2X2 + F7X2, \text{ and}$$

substituting F3=F2, $$RYX1 + RXY1 = F3X2 + F7X2, \text{ and}$$

$$RY + F1 + F7 = 0$$

By relieving the bottom edge of the cutting tip 40, it is feasible to make force F1 equal zero, at least for most materials and a sharp cutting tip 40. Then, $$RY = -F7, \text{ and}$$

$$RYX1 + RXY1 = F3X2 - RYX2$$

It is possible to let Y1=0 by placing the reaction point, axle 62, in line with the cutting tip force L. Thus, $$RYX1 + RYX2 = F3X2 \text{ or, } RY(X1+X2) = F3X2$$

Since, for any nontrivial case, F3 cannot be zero, it is found that $$RY = \frac{F3X2}{(X1+X2)}$$

where X2<<X1, and RY is, therefore, small compared to F3. It is also seen that, for conditions where the cutting tip 40 is not self-feeding, the cutting tip force L may be reacted at an elevated position such as mounting hole 66', thereby giving a relatively large moment arm, Y1. Since RX=L, a positive moment, LY1, may be provided to urge the cutting tip 40 into the workpiece 20. By definition, in this case, F1 is nonzero, and, if the clockwise moment is larger than need be to provide F1, force F7 will provide the difference.

Thus, in all cases it is seen that the cutting forces are controlled within the parting tool body 30, and the reaction RY is reduced from the value of F3 by the ratio of the moment arms, X1/(X1+X2). Force RY also provides any force necessary to counteract the moment from an external force, F8 and could be positive, negative, or zero. Force RX is controlled by the longitudinal cutting force L, and is a function, primarily, of the properties of the workpiece 20 and the cutting tip 40. There are no unstable forces, and all forces are independent of the depth of the kerf. The method of analysis would not be changed by using a different reaction point, such as an outboard mounting hole 68, or similar.

Accordingly, an appreciation for the advantage of the invention results from an understanding of the fact that the combination workpiece/cutting tip reaction forces F1, F2, F4 and F5 are completely neutralized in the vicinity of the cutting tip 40 and rubbing pad 46 areas, and within the body of the tool body 30 itself. While tool body 30 has a cantilevered section analogous to conventional parting tools known in the art, this cantilever is comparatively short, is completely contained within tool body 30, and in no way involves the tool rest or post, the lathe proper, or the operator. The spring-like flexibility described as affecting the devices commonly available in the art thus do not occur. In the invention, the spring-like flexibility of the entire tool-and-lathe system are nearly eliminated, the only vestige being the vertical flexibility of the tool 30 itself.

FIG. 15 illustrates an alternative embodiment of the apparatus of the invention. It may be desirable to modify the relative positions of cutting tip 40 and rubbing pad 46. The positions of these lements may be adjusted in a variety of ways, using springs and clips, adjustment screws, slidable wedges, or the like. In the FIG. 15 embodiment, for example, the relative positions of the cutting tip 40 and the rubbing pad 46 may be adjusted by manipulating puck 80 within tapered slot 84. Puck 80 is a solid disc of steel or the like. Tapered slot 84 is disposed through tool body 30 between chip clearance 48 and the head 34. As shown in FIG. 16, puck 80 has a groove or notch completely about its circumference, which notch corresponds to a ridge along the top side 86 and bottom side 88 of tapered slot 84. Puck 80 is disposed within tapered slot 84 such that the ridges in the sides of slot 84 are within the groove of the puck 80 at the two points where puck 80 contacts the sides of tapered slot 84. (Alternatively, the slot 84 may be equipped with grooves into which is inserted a corresponding ridge upon the circumferential edge of puck 80.)

Top side 86 of tapered slot 84 is not parallel to bottom side 88. Rather, in the absence of an inserted puck 80, top side 86 and bottom side 88 tend towards convergence in the direction of head 34. Stated differently, when tool body 30 is unflexed due to the insertion of a puck 80, sides 86 and 88 of slot 84 are further apart in the vicinity of chip clearance 48 than they are in the vicinity of head 34. The full diameter of puck 80 is approximately equal to the maximum distance between top side 86 and bottom side 88 of slot 84.

The relative offset of cutting tip 40 and rubbing pad 46 with respect to the workpiece, as well as the absolute distance between the tip 40 and the pad 46, may be varied by moving puck within and along slot 84. This object is accomplished by inducing a slight elastic flexing of the portion of tool body 30 between the tapered slot 84 and working edge 32. Since puck 80 has a diameter equal to the maximum separation of the sides 86 and 88 of slot, the "default," or unflexed rest condition of tool body 30 obtains when puck 80 is at the end of slot proximate to rubbing pad 46 and chip clearance 48, as shown in FIG. 15. A special pronged key may used in association with holes in puck 80, or a screwdriver-type tool is used with a slot in the puck 80, to rotate puck 80 to cause it to move to and fro within tapered slot 84. It is apparent that as puck 80 is moved toward the narrower end of tapered slot 84, it acts as a type of wedge to induce bending in tool body 30 between working edge 32 and chip clearance 48. As puck 80 is moved within slot toward head 34, the portion of tool body 30 between slot 84 and working edge 32 will be flexed outward/downward, i.e., away from the relatively immobile top side 86 of tapered slot 84. This flexure occurs within the plane of tool body 30, that is, the adjustable movement of rubbing pad 46 with respect to tip 40 is within the spatial plane defined by tool body 30; no relative movement occurs in the dimension normal to tool body 30.

As the foregoing is performed, the position of rubbing pad 46 with respect to cutting tip 40 may be controllably varied. Chip depth is a function of the tangential offset between tip 40 and rubbing pad 46. (Chip depth is also a function, to a certain extent, of the external force applied to tool body 30 by the operator.) By moving puck 80 within tapered slot 84, the user can control maximum chip depth, that is the amount of material removed by cutting tip 40 per revolution of the workpiece 20.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

I claim:

1. An apparatus for parting-off a rotating workpiece, said apparatus comprising:
    means for cutting the workpiece, said means for cutting being forcible against the workpiece;
    a rubbing pad, disposed proximately to said means for cutting, and forcible against the workpiece; and
    means for substantially neutralizing in the immediate vicinity of said means for cutting and said rubbing pad reaction forces upon said means for cutting and said rubbing pad.

2. The apparatus of claim 1 wherein said means for substantially neutralizing comprises a tool body.

3. The apparatus of claim 2 wherein said means for cutting comprises means for incising the workpiece with a kerf at least as thick as said tool body or said rubbing pad.

4. The apparatus of claim 3 wherein said means for incising comprises a cutting tip disposed upon said tool body.

5. The apparatus of claim 2 further comprising a cutting gap between said means for cutting and said rubbing pad.

6. The apparatus of claim 5 wherein said cutting gap comprises a chip clearance in said tool body sufficient to permit chips to clear at any depth in cutting of a kerf.

7. The apparatus of claim 6 further comprising at least two spacing shims disposed on said tool body.

8. The apparatus of claim 1 further comprising means for adjusting the relative position of said rubbing pad with respect to said means for cutting.

9. The apparatus of claim 8 wherein said means for adjusting comprises:
    a tapered slot within a tool body; and
    a disk movably disposed within said tapered slot.

10. A method of parting-off a rotating workpiece comprising the steps of:
    (a) pushing a cutting means against the workpiece, thereby cutting the workpiece;
    (b) disposing a rubbing pad proximate to the cutting means;
    (c) permitting the rubbing pad to rub against the workpiece; and (d) substantially neutralizing in the immediate vicinity of the cutting means and the rubbing pad reaction forces upon the cutting means and the rubbing pad.

11. The method of claim 10 wherein the step of substantially neutralizing comprises providing a tool body supporting the cutting means and the rubbing pad.

12. The method of claim 11 wherein the step of cutting comprises incising the workpiece with a kerf at least as thick as the tool body or the rubbing pad.

13. The method of claim 12 further comprising the step of disposing a cutting tip upon the tool body.

14. The method of claim 11 further comprising the step of providing a cutting gap between the cutting means and the rubbing pad.

15. The method of claim 14 wherein the step of providing a cutting gap comprises creating a chip clearance in the tool body sufficient to permit chips to clear at any depth in cutting of a kerf.

16. The method of claim 14 further comprising the step of symmetrically spacing the tool body within the kerf.

17. The method of claim 10 further comprising the step of adjusting the relative position of the rubbing pad with respect to the cutting means.

18. The method of claim 17 wherein the step of adjusting comprises the steps of:

a) disposing a tapered slot within the tool body; and b) moving a disk within the tapered slot.

19. A method for cutting a workpiece rotating within a lathe, the method comprising the steps of:

(a) providing a tool body;

(b) providing a tool body support means;

(c) providing a rubbing pad upon the tool body;

(d) mounting a cutting tip upon the tool body;

(e) pressing the cutting tip against the workpiece, thereby inducing a first reaction force upon the cutting tip;

(f) resting the rubbing pad upon the workpiece, thereby inducing a second reaction force upon the rubbing pad; and (g) resisting within the tool body the first reaction force and the second reaction force, whereby transfer of the reaction forces to the tool body support means is substantially neutralized.

20. The method of claim 19 wherein the step of providing a tool body support means comprises manually grasping the tool body.

21. The method of claim 19 further comprising the steps of:

(a) progressively incising with the cutting tip a kerf into the workpiece; and (b) progressively inserting the rubbing pad and the tool body into the kerf.

22. The method of claim 21 further comprising the step of maintaining the rubbing pad in substantially constant contact with the workpiece.

23. The method of claim 21 further comprising the step of controllably moving the tool body within the kerf to intermittently interrupt the incising of the kerf.

24. The method of claim 21 further comprising the step of symmetrically spacing the tool body within the kerf.

25. The method of claim 21 further comprising the step of providing a chip clearance in the tool body sufficient to permit chips to clear at any depth in cutting of a kerf.

26. The method of claim 21 further comprising the step of adjusting the relative position of the rubbing pad with respect to the cutting tip.

27. The method of claim 26 wherein the step of adjusting comprises the steps of:

a) disposing a tapered slot within the tool body; and b) moving a disk within the tapered slot.

28. In a parting-off tool pressed against a workpiece rotating within a lathe thereby progressively cutting a kerf into the workpiece, an improved means for controlling tool chatter and vibration, said improved means comprising a planar tool body, a cutting tip disposed on said body, and a rubbing pad disposed on said body; said body, cutting tip and rubbing pad being progressively insertable into the kerf, whereby the rubbing pad and the cutting tip are maintained in substantially constant contact with an uncut section of the workpiece and tool chatter and vibration are substantially avoided at all depths in the kerf.

* * * * *